(12) United States Patent
Galligan et al.

(10) Patent No.: US 7,704,915 B2
(45) Date of Patent: *Apr. 27, 2010

(54) METHODS FOR PREPARING COATED METAL SUBSTRATES

(75) Inventors: Michael P. Galligan, Cranford, NJ (US); Young G. Kim, Edison, NJ (US)

(73) Assignee: BASF Catalysts LLC, Florham Park, NJ (US)

( * ) Notice: Subject to any disclaimer, the term of this patent is extended or adjusted under 35 U.S.C. 154(b) by 618 days.

This patent is subject to a terminal disclaimer.

(21) Appl. No.: 11/603,887

(22) Filed: Nov. 22, 2006

(65) Prior Publication Data

US 2007/0082810 A1 Apr. 12, 2007

Related U.S. Application Data

(62) Division of application No. 10/757,684, filed on Jan. 14, 2004, now Pat. No. 7,271,125.

(51) Int. Cl.
*B01J 21/00* (2006.01)
*B01J 23/00* (2006.01)
*B01J 23/08* (2006.01)
*B01J 20/00* (2006.01)

(52) U.S. Cl. ............ 502/263; 502/355; 502/407; 502/415; 502/439

(58) Field of Classification Search .......... 502/263, 502/355, 407, 415, 439
See application file for complete search history.

(56) References Cited

U.S. PATENT DOCUMENTS

| | | | |
|---|---|---|---|
| 3,222,219 A | 12/1965 | Saunders et al. | |
| 3,443,978 A | 5/1969 | Restall | |
| 3,518,206 A | 6/1970 | Sowards et al. | |
| 3,891,575 A | 6/1975 | Brautigam et al. | |
| 4,277,374 A | 7/1981 | Lula et al. | |
| 4,374,173 A | 2/1983 | Adamovic | |
| 4,492,769 A | 1/1985 | Blanchard et al. | |
| 4,904,518 A | 2/1990 | Mercer et al. | |
| 4,962,280 A * | 10/1990 | Tijburg et al. | 502/439 |
| 5,168,085 A | 12/1992 | Addiego et al. | |
| 5,204,302 A | 4/1993 | Gorynin et al. | |
| 5,244,852 A | 9/1993 | Lachman et al. | |
| 5,422,331 A | 6/1995 | Galligan et al. | |
| 5,437,933 A | 8/1995 | Coupland et al. | |
| 5,750,026 A | 5/1998 | Gadkaree et al. | |
| 6,214,303 B1 | 4/2001 | Hoke et al. | |
| 6,559,094 B1 | 5/2003 | Korotkikh et al. | |
| 6,596,243 B1 * | 7/2003 | Fujii et al. | 422/177 |
| 6,725,656 B2 | 4/2004 | Moore, III | |
| 6,929,705 B2 * | 8/2005 | Myers et al. | 148/243 |
| 7,037,878 B2 * | 5/2006 | Liu et al. | 502/326 |
| 2002/0132730 A1 | 9/2002 | Hwang et al. | |
| 2003/0003318 A1 | 1/2003 | Spitsberg et al. | |
| 2003/0144144 A1 | 7/2003 | Goto et al. | |
| 2003/0165414 A1 | 9/2003 | Galligan et al. | |

FOREIGN PATENT DOCUMENTS

| | | |
|---|---|---|
| EP | 0813899 | 12/1997 |
| JP | 54028787 | 3/1979 |
| JP | 57117347 | 7/1982 |
| WO | WO03050397 | 6/2003 |

* cited by examiner

*Primary Examiner*—Cam N Nguyen
(74) *Attorney, Agent, or Firm*—Scott S. Servilla; Diehl Servilla LLC; Melanie L. Brown

(57) ABSTRACT

A coated metal substrate useful for carrying an exhaust emission treatment catalyst such as a three-way conversion catalyst for use with small engine platforms. The coated metal substrate comprises a metal such as a stainless steel, a carbon steel, a FeCr alloy, HASTELLOY® and the like. The coating on the metal substrate comprises an alumina silicate having alumina particles impregnated therein. The coating is applied using a liquid dispersion containing an aluminum silicate and the alumina particles are dispersed into the aluminum silicate coating while the coating is still wet. The coated metal substrate is then calcined. Thereafter, a washcoat containing an engine exhaust treatment catalyst may be applied to the surface of the coated metal substrate.

20 Claims, No Drawings

METHODS FOR PREPARING COATED METAL SUBSTRATES

CROSS-REFERENCE TO RELATED APPLICATIONS

This application is a divisional application of U.S. Ser. No. 10/757,684 filed Jan. 14, 2004, the disclosure of which is hereby incorporated in its entirety by reference thereto.

FIELD OF THE INVENTION

The invention relates to a coated metal substrate useful for carrying an engine exhaust treatment catalyst and methods for preparing coated metal substrates.

BACKGROUND OF THE INVENTION

Small internal combustion engines, especially two-stroke and four-stroke spark ignition engines, are used to provide power to a variety of machinery, e.g., gasoline-powered lawn mowers, chain saws, leaf blowers, string cutters, leaf blowers, motor scooters, motorcycles and the like. Such engines provide a severe environment for a catalytic exhaust treatment apparatus. This is due to the fact that in small engines, the exhaust gas contains a high concentration of unburned fuel and unconsumed oxygen.

Additionally, the vibrational force in a two-stroke engine can be three or four times that of a four-stroke engine. For example, vibrational accelerations of 70 to 90 gravitational acceleration at 150 Hertz have been reported for small internal combustion engines. The harsh vibration and exhaust gas temperature conditions associated with small internal combustion engines lead to several modes of failure in the exhaust gas catalytic treatment apparatus, including failure of the mounting structure by which a catalyst member is secured in the apparatus and consequential damage or destruction of the catalyst member due to the mechanical vibration and to flow fluctuation of the exhaust gas under high temperature conditions.

The catalyst member usually comprises a ceramic-like carrier member typically made of e.g., cordierite, mullite, etc., on which an exhaust treatment catalytic material is coated. The ceramic-like material is subject to cracking and pulverization due to excessive vibration. Metal carrier members, i.e., metal substrates, are obvious replacements for the ceramic-like materials, but have their own problems as brought out below.

In the near future, small internal combustion engines will become subject to stringent federal and state emission control regulations. Accordingly, these small engines will require exhaust emission control systems analogous to those currently employed for control of automotive emissions.

For the exhaust emission control systems to be used for the small internal combustion engines typically a metal substrate (also referred to in the prior art as a metal carrier member) will be coated with an exhaust control treatment catalyst such as a three-way conversion ("TWC") catalyst that will control the emissions of hydrocarbons, carbon monoxide and nitrogen oxides. The challenge has been to impart the required physical properties to the metal substrate that will permit the catalyst to withstand high temperature conditions with severe vibration and poisons from oil and ash over a wide variety of small engine platforms with limited lives and the need for such small engine platforms to operate under a wide range of air/fuel ratios and space velocities. Major differences in the coefficients of thermal expansion of a precious metal catalyst and the metal substrate exacerbate this problem.

The exhaust control emission catalyst materials are typically used in particulate form with particles in the micron-sized range, e.g., 10 to 20 microns in diameter, so that they can be formed into a slurry and applied as a washcoat on the carrier member. Known TWC catalysts that exhibit good activity and long life comprise one or more platinum group metals (e.g., platinum or palladium, rhodium, ruthenium and iridium) disposed on a high surface area, refractory oxide support, e.g., a high surface area alumina coating. The principal problem associated with the coating of metal substrates with an exhaust emission control treatment catalyst such as a TWC catalyst is adherence of the catalyst to the metal substrate over the wide range of conditions to which the catalyst-coated metal substrate will be exposed during operation of the small engine platform.

OBJECT OF THE INVENTION

It is an object of the invention to provide a coating composition and a method for coating a metal substrate that is effective for anchoring an exhaust emission control treatment catalyst to the metal substrate.

SUMMARY OF THE INVENTION

The invention relates to a coated metal substrate for use in the catalytic reduction of engine exhaust emissions comprising a metal substrate and an alumina-silicate coating on the metal substrate, said coating having alumina particles dispersed therein.

DETAILS OF THE INVENTION

For the purposes of the present invention, the metal substrate may be comprised of a metal such as stainless steel, a carbon steel, titanium, a FeCr alloy or HASTELLOY®. HASTELLOY® is a trademark for an alloy whose major components are nickel-chromium and molybdenum and containing minor components comprising cobalt, iron and tungsten.

Typically, the metal substrates to be used for the small engine platforms will be present in the form of an expansion cone or exhaust gas silencer, having a length of about 100 to about 300 mm, a diameter ranging from about 30 to about 100 mm, a thickness of about 0.5 to about 3 mm and an inside surface area of about 0.03 to about 0.06 $m^2$.

The bond coat on the surface of the metal substrate comprises an alumina-silicate composition that contains alumina particles dispersed therein. It has been found that an alumina-silicate composition adheres very well to the surface of the metal substrate. However, the surface of the alumina-silicate bond coat is quite smooth and exhaust emission treatment catalyst compositions do not adhere too well to the surface of the bond coat, particularly under the conditions to which the coated metal substrate will be exposed during operation of the small engine platform. It was found that when particles of alumina were dispersed in the bond coat while it was still wet, after calcination of the resultant coated metal substrate, the exhaust emission treatment catalyst adhered quite well to the coated metal substrate under all operating conditions associated with the small engine platforms.

The procedure for applying the bond coat and for dispersal of the alumina particles in the bond coat is relatively simple. If necessary, the metal substrate is sandblasted to form a rough surface and remove any unwanted particles; thereafter, the sandblasted metal substrate may be washed in 30% acetic acid followed by a water rinse. The bond coat composition comprising an aqueous dispersion in which the major component is an aluminum silicate is then applied to the clean surface of the metal substrate, e.g., by dipping, brushing, sponge roller, air gun spraying, etc. Thereafter, alumina particles are applied, e.g., by dipping, brushing, etc., to the coated metal substrate while the bond coat on the metal substrate is still wet. Loose alumina particles may then be removed from the coated surface, e.g., by a gentle stream of air, by tapping on a hard surface, etc., and the resultant coated metal substrate is thereafter calcined. Subsequent to calcination, an exhaust emission treatment catalytic washcoat containing one or more precious metals such as platinum, palladium, rhodium, etc., may then be applied to the surface of the coated metal substrate by conventional methods well known in the prior art followed by drying and calcination of the catalyst-loaded coated metal substrate.

The process for preparing the coated metal substrate of the invention may be summarized as involving the following steps:

(a) coating a metal substrate with a liquid dispersion containing an aluminum silicate;

(b) impregnating the coated metal substrate resulting from step (a) with alumina particles, while the aluminum silicate coating on the metal substrate is still wet; and (c) calcining the coated metal substrate resulting from step (b).

Liquid dispersions containing an aluminum silicate are well known in the prior art and are commercially available. A suitable aluminum silicate dispersion is the following composition:

| component | amount, wt. % |
|---|---|
| sodium potassium aluminum silicate | about 40 to about 45 |
| water | about 35 to about 40 |
| acrylic copolymer | about 1 to about 5 |
| chromia titania frit | about 1 to about 5 |
| aluminum oxide | about 1 to about 5 |
| potassium hydroxide | about 1 to about 5 |
| amorphous silica | about 1 to about 5 |
| cobalt oxide | about 1 to about 5 |

Another suitable aluminum silicate dispersion is the following composition:

| component | amount, wt. % |
|---|---|
| silicon carbide | about 45 to about 50 |
| water | about 20 to about 26 |
| aluminum phosphate | about 10 to about 15 |
| amorphous silicon oxide binders | about 2 to about 6 |
| boric acid | about 1 to about 3 |
| ethyl alcohol | about 3 to about 7 |
| mullite | about 4 to about 6 |

The alumina particles are applied in step (b) of the process in the form of a powder wherein the particles have a particle size in the range of about 5 to about 15 microns, preferably 6 to 9 microns. The alumina particles are applied in an amount of about 0.01 to about 0.5 g/in$^2$ of the aluminum silicate coating that was applied in step (a) of the process. Step (c), i.e., the calcination, is carried out at a temperature of about 350 to about 550° C. for about 0.25 to about 2 hours.

A washcoat containing an engine exhaust treatment catalyst may then be applied (e.g., by spraying, dipping, rolling, etc.) to the coated metal substrate resulting from step (c), followed by air drying at about 60 to about 100° C. for about 0.5 to about 2 hours and subsequent calcination at a temperature of about 350 to about 550° C. for about 0.25 to about 2 hours.

The following nonlimiting examples shall serve to illustrate the embodiments of the present invention. Unless otherwise indicated, all parts and percentages are on a weight basis.

EXAMPLE 1

The metal substrate employed in this example was an expansion cone comprised of 1.3 mm gauge 309 stainless steel. The expansion cone had a length of 172 mm, an inside diameter ranging from 40.2 mm to 66.4 mm and a calculated area of 0.0288 m$^2$. The expansion cone was sandblasted, washed with 30% acetic acid and rinsed with distilled water.

The cleaned expansion cone was then air gun-sprayed with an aluminum-silicate dispersion having the following composition:

| component | amount, wt. % |
|---|---|
| sodium potassium aluminum silicate | about 40 to about 45 |
| water | about 35 to about 40 |
| acrylic copolymer | about 1 to about 5 |
| chromia titania frit | about 1 to about 5 |
| aluminum oxide | about 1 to about 5 |
| potassium hydroxide | about 1 to about 5 |
| amorphous silica | about 1 to about 5 |
| cobalt oxide | about 1 to about 5 |

The sprayed expansion cone was then calcined at a temperature of 450° C. for a period of 30 minutes. Laboratory thermal shock testing indicated that the alumina-silicate coating readily survives temperature cycling in excess of 1000° C.

After calcination, the cone was cooled to room temperature and a washcoat comprised of an engine exhaust treatment catalyst was then applied at a target rate of 1.75 g per cone using a hand held air spray gun so as to apply 0.07 g precious metal per cone. The washcoat consisted of an aqueous slurry (35 wt. % solids) of an engine exhaust treatment catalyst consisting of the following components:

| component | amount, g/in$^3$ |
|---|---|
| high surface area alumina | 0.61 |
| CeZr coprecipitated composite | 0.31 |
| barium acetate | 0.04 |
| zirconium acetate | 0.025 |
| Pt (as ammonium hydroxide) | 0.037 |
| Pd (as nitrate) | 0.0037 |

The resultant cone was then air dried at 80° for 1 hour and then calcined at 450° C. for 30 minutes. No further studies were conducted on the coated expansion cone since the wash coat slurry did not adhere to the surface of the alumina-silicate coated expansion cone.

EXAMPLE 2

Example 1 was repeated with the following exceptions: The expansion cone was coated with the same aluminum-silicate dispersion by means of a sponge roller rather than by air gun spraying. The coated cone was then dipped into alumina powder having a particle size range of 2-15 microns) while the surface of the cone was still wet with the aluminum-silicate dispersion. The cone was then tapped on a hard surface to remove loose alumina particles followed by calcination at a temperature of 450° C. for a period of 30 minutes. The coated cone contained about 0.3 g of the alumina particles.

Following calcination, the cone was cooled to room temperature and the same washcoat as employed in Example 1 was applied to the coated cone at a target rate of 1.75 g per cone using a hand held air spray gun so as to apply 0.07 g precious metal per cone. The resultant cone was then air dried at 80° for 1 hour and then calcined at 450° C. for 30 minutes.

Laboratory thermal shock testing of the coated cone of Example 2 indicated that the alumina-silicate coating readily survives temperature cycling in excess of 1000° C. The coated cone of Example 2 was close-coupled engine aged on a stationary generator for a period of about 300 hours. Visual inspection of the aged cone showed no significant physical deterioration of the coating.

What is claimed is:

1. A method for preparing a coated metal substrate for use in the catalytic reduction of engine exhaust emissions comprising the steps of:
   (a) cleaning the surface of a metal substrate;
   (b) coating the metal substrate with a liquid dispersion containing an aluminum silicate;
   (c) impregnating the coated metal substrate resulting from step (b) with alumina particles having a particle size in the range of about 5 to about 15 microns, while the aluminum silicate coating on the metal substrate is still wet; and
   (d) calcining the coated metal substrate resulting from step (c).

2. The method of claim 1 wherein step (d) is carried out at a temperature of about 350 to about 550° C. for about 0.25 to about 2 hours.

3. The method of claim 1 further comprising applying a washcoat comprising an engine exhaust treatment catalyst to the coated metal substrate resulting from step (d).

4. The method of claim 3 wherein the catalyst comprises a three-way conversion catalyst.

5. The method of claim 3, wherein the washcoat is applied to the coated metal substrate using a method selected from spraying, dipping or rolling.

6. The method of claim 3, further comprising air drying the coated metal substrate at about 60° C. to about 100° C. for about 0.5 to about 2 hours, after applying the washcoat.

7. The method of claim 6, further comprising the step of calcining the coated metal substrate at a temperature of about 350° C. to about 550° C. for about 0.25 to about 2 hours after air drying the coated metal substrate.

8. The method of claim 1 wherein the metal substrate comprises a metal selected from the group consisting of a stainless steel, a carbon steel, titanium, a FeCr alloy and a metal alloy containing nickel, chromium and molybdenum.

9. The method of claim 8 wherein the metal substrate comprises a stainless steel.

10. The method of claim 1 wherein the alumina particles have a particle size in the range of 6 to 9 microns.

11. The method of claim 1 wherein the alumina particles are present in an amount of about 0.01 to about 0.5 g/in$^2$ of the aluminum silicate coating.

12. The method of claim 1 wherein the liquid dispersion comprises the following components in the indicated amounts:

| component | amount, wt. % |
| --- | --- |
| sodium potassium aluminum silicate | about 40 to about 45 |
| water | about 35 to about 40 |
| acrylic copolymer | about 1 to about 5 |
| chromia titania frit | about 1 to about 5 |
| aluminum oxide | about 1 to about 5 |
| potassium hydroxide | about 1 to about 5 |
| amorphous silica | about 1 to about 5 |
| cobalt oxide | about 1 to about 5 |

13. The method of claim 1 wherein the liquid dispersion comprises the following components in the indicated amounts:

| component | amount, wt. % |
| --- | --- |
| silicon carbide | about 45 to about 50 |
| water | about 20 to about 26 |
| aluminum phosphate | about 10 to about 15 |
| amorphous silicon oxide binders | about 2 to about 6 |
| boric acid | about 1 to about 3 |
| ethyl alcohol | about 3 to about 7 |
| mullite | about 4 to about 6 |

14. The method of claim 1, wherein the liquid dispersion is applied to the metal substrate using a method selected from dipping, brushing, sponge roller, or air gun spraying.

15. The method of claim 1, wherein the alumina particles are impregnated to the coated metal using a method selected from dipping or brushing.

16. A method for preparing a coated metal substrate for use in the catalytic reduction of engine exhaust emissions comprising the steps of:
   (a) cleaning the surface of a metal substrate, wherein the metal substrate is employed in the form of an expansion cone or exhaust gas silencer;
   (b) coating the metal substrate with a liquid dispersion containing an aluminum silicate;
   (c) impregnating the coated metal substrate resulting from step (b) with alumina particles having a particle size in the range of about 5 to about 15 microns, while the aluminum silicate coating on the metal substrate is still wet; and
   (d) calcining the coated metal substrate resulting from step (c).

17. The method of claim 16 wherein the expansion cone has a length of about 200 to about 300 mm, a diameter ranging from about 30 to about 100 mm, a thickness of about 0.5 to about 3 mm and an inside surface area of about 0.03 to about 0.06 m$^2$.

18. The method of claim 17, wherein the expansion cone has a length of about 100 mm to 300 mm.

19. The method of claim 16 further comprising applying a washcoat comprising an engine exhaust treatment catalyst to the coated metal substrate resulting from step (d).

20. The method of claim 19 wherein the catalyst comprises a three-way conversion catalyst.

* * * * *